Nov. 18, 1952          A. MATLAS          2,618,414
DISPENSING DEVICE FOR VISCOUS MATERIALS
Filed Nov. 22, 1950
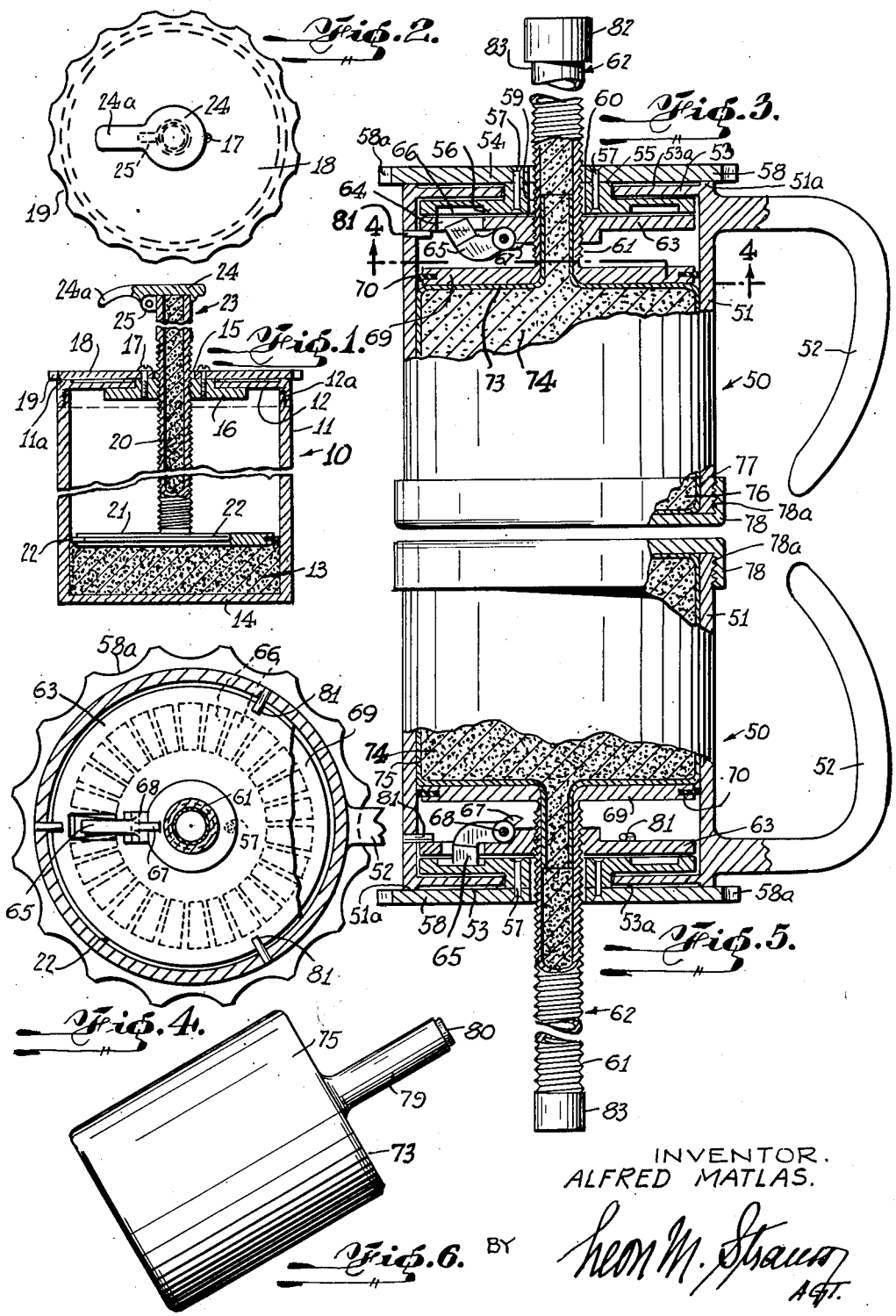
INVENTOR.
ALFRED MATLAS.

Patented Nov. 18, 1952

2,618,414

UNITED STATES PATENT OFFICE 2,618,414

DISPENSING DEVICE FOR VISCOUS MATERIALS

Alfred Matlas, New York, N. Y., assignor to David Weinberger, New York, N. Y.

Application November 22, 1950, Serial No. 197,132

2 Claims. (Cl. 222—320)

The present invention relates to dispensers and more particularly to improvements in or relating to containers having incorporated therein dispensing devices. Such containers may be used for dispensing in particular pasty or semi-liquid masses, such as mustard, catsup, and similar condiments or spices, whipped cream and other edible or non-edible substances having relatively high viscosity. The containers may be made of any suitable material, such as plastic, plastic composition, ceramic, glass, etc.

It is one of the objects of this invention to provide means facilitating quantitative discharge of a paste-like mass from a container or receptacle.

It is another object of the present invention to provide means ensuring a relatively simple and effective mechanism to be applied to a container for discharging semi-liquid or pasty masses from within the container therewithout.

Still another object of the present invention is to provide means affording the discharge of the mass from the container only when the same is in a predetermined position, such as in upside-down position to permit release of the pasty mass from within said container.

Yet a further object of the present invention is the provision of means enabling immediate refill of the container in the form of a cartridge or a similar appliance to thereby safeguard hygienic condition under which the dispensing device is to be operated.

A still further object of the present invention is to provide means facilitating the discharge of the cartridge either from within the receptacle or by releasing the contents of the cartridge into the receptacle from therewithout.

Yet a further object of the invention is the provision of means preventing any contact of the mechanism with the viscous or pasty mass to be dispensed from within the container and the operation of the mechanism with one finger only of the hand of a person holding the container.

With the above and other objects in view which will appear as the description proceeds, the invention resides in the novel construction, combination and arrangement of parts substantially as hereinafter described and more particularly defined by the claims, it being understood that such changes in the precise embodiments of the herein disclosed invention may be made as come within the scope of the claims.

In the drawing:

Fig. 1 is a vertical section through a dispensing device embodying the invention and applied to a container.

Fig. 2 is a top plan view of Fig. 1.

Fig. 3 is an elevational view of a container with dispensing device, partly in section illustrating a modified form of the invention and shown in inoperative position.

Fig. 4 is a sectional view taken along line 4—4 of Fig. 3.

Fig. 5 is a view similar to that of Fig. 3, but showing the dispensing device in operative position, parts of said device and container being shown in section.

Fig. 6 is a side view of a cartridge used forming a collapsible refill.

Referring now more specifically to the attached drawing, there is disclosed a container 10 made of glass or other transparent material, such as plastic composition, having a cylindrical wall 11 with an upper threaded end 12a for the engagement with the top wall 12 forming part of a dispensing mechanism later described. Container 10 has further the bottom wall 14 and contains a pasty or viscous substance 13, such as mayonnaise, mustard, catsup or oily mass of suitable viscosity.

Container 10 may be a screw cap receptacle of conventional design, which has previously been filled with a desired viscous substance. Upon removal of the screw cap (not shown) the mechanism may be fastened to the threaded container end 12a. This mechanism comprises an operating member 18 in the form of a rotatable disk having the peripheral notches 19 which form finger rests, and further a plate-shaped nut member 16 extending for abutment against the top wall 12 and against disk member 18 to which nut member 16 is connected by a plurality of threaded pins 17. While nut member 16 is provided with a central bore having screw threads, a sufficiently large perforation 15 is apparent in operating member 18 to clear the threaded portion 20 of a hollow piston rod 23. In order to reduce frictional engagement of disk 18 with respect to top wall 12 the latter is provided with a projecting circular rim 11a Hollow piston rod 23 is integral with piston 21, which carries a peripheral sealing ring 22 preferably made of rubber or similar tight fitting material adapted to move along the inner surface of cylindrical wall 11. The upper end of piston rod 23 carries on hinge lug 25 a swingable closure or cover 24 having a lever 24a to be actuated by means of a finger of a hand, as is well understood.

As it is apparent hinged cover 24 will open automatically if container 10 is held upside down by the hand of the operator who then actuates the threaded portion 20 of the piston rod 23 through the engagement of nut member 16 therewith, said nut member being coupled to actuating or operating disk 18. Notches 19 of disk 18 are engaged successively by a finger of said hand of the operator.

While the threads 20 of the piston rod 23 are right-handed, the threads 12a are left-handed or vice versa. Thus, the nut member 16 in unison with disk 18 are rotated relatively to top wall 12 to effectuate displacement of piston 21 against the substance 13 which then passes through hollow piston rod 23 for discharge from the container 10 in predetermined quantities depending on the number of notches 19 actuated by the finger of the hand.

Figs. 3 to 5, inclusive, illustrate a device similar to that of Fig. 1. However, the device shown in Fig. 3 can only be effectively actuated when placed in upside down position, as seen in Fig. 5. The container body 50 has a cylindrical upright wall 51 with handle 52. This handle may be made integral with the container 50 or not. Wall 51 has an inwardly turned flange extension 53 forming the top wall of the container. Top wall 53 is further provided with a circular rim 51a on which the actuating or operating disk 58 rests for a purpose later described. Either top wall 53 or operating disk 58 may have a recess 53a spacing the operating disk 58 from said top wall 53.

Connected through rivets 57 with operating disk 58 is a plate element 56 having a hub 55 with a central bore 59 larger in diameter than that of threaded portion 61 of piston rod 62. The underface of plate element 56 is provided with circularly arranged tooth-shaped elements 66 within the grooves of which a detent 65 may be engaged, as will be later described.

Adjacent the underface of plate element 56 is a circular-shaped nut member 63 engaging the threaded portion 61 of the piston rod 62. This nut member 63 swingably carries at 68 detent 65 which is adapted to pass through a slot or opening 64 of nut member 63 for the engagement with one of the tooth elements 66. Detent 65 is further provided with an abutment 67 limiting the outward swinging movement of detent 65 in disengaged or inoperative position.

Operating disk 58 is provided with a central bore 60 aligned with bore 59, which clears the threaded portion 61 of hollow piston rod 62. Operating disk 58 is further provided with peripheral notches 58a for the engagement of a finger or fingers of the hand of an operator.

Container 50 is shown with a piston 69 integral with piston rod 62 and carrying a peripheral gasket 70 similar to sealing ring 22 of Fig. 1. In the present instance container 50 is provided with a bottom cover 78 having the inner threads 78a adapted to engage with threads 77 of the cylindrical wall of the container 50.

Upon removal of bottom cover 78 a cartridge 75 (Fig. 6) may be inserted into container 50. This cartridge may be made of cellophane or similar material which can be easily brought into collapsed condition. Cartridge 75 forming a refill is provided with a neck portion 79 and a plug or closure member 80. This cartridge 75 may be filled, for instance, with a viscous substance and upon removal of closure member 80 cartridge 75 may be inserted from below into container 50 and with the neck 79, which is smaller than the inner diameter of the hollow piston rod 62 for insertion into the lower part of the latter.

The upper wall 73 of cartridge 75 is adapted for abutment against the underface of piston 69 whereby upon displacement of piston 69 against upper wall 73 of the cartridge the viscous mass 74 may be displaced within the cartridge 75.

The operation of the device shown in Figs. 3 to 5 is as follows:

Upon insertion of the cartridge 75 into the container 50 and after having moved piston 69 into its uppermost position (as seen in Fig. 3) the discharge of the viscous substance 74 may be had as follows:

Upon rotation of actuating disk 58 moved by a finger of the hand grasping handle 52 and engaging subsequent notches 58a of disk 58 the piston rod engaging nut member 63 will only then become operative when the container 50 is held in upside down position, as seen in Fig. 5.

In this position detent 65 will swing to its extreme position in which it engages a selected tooth 66 of plate element 56 so that the rotation of disk 58 will be transmitted through plate element 56 to nut member 63 whereby the piston rod 62 is fed through bores 59, 60 while piston 69 presses against the cartridge and causes discharge of substance 74 therefrom and through the hollow piston rod 62 to the discharge end 83 thereof.

As soon as the container 50 is placed in its upright position, as seen in Fig. 3, detent 65 will become disengaged from plate element 56 and thus disk 58 becomes uncoupled from nut member 63 and will rotate idly. Discharge end 83 may be provided with a sleeve-shaped cover 82, if desired.

In order to hold nut member 63 substantially undisplaceably within container 50 retainer pins 81 may be employed which are driven through suitable openings within the cylindrical wall 51 to the undersurface of nut member 63, which is thus supported by the three pins 81 (see Fig. 4) on the one hand and by spacer plate element 56 on the other hand. If the container 50 is turned upside down, as seen in Fig. 5, a predetermined quantity or quantities of pasty substance 74 may be squeezed out from within the container by exerting pressure of piston 69 against upper wall 73 of cartridge 75.

Thus, container 50 forms only a guide for the round cartridge 75 which is displaceable within container 50 to collapsed position. If it is desired to use the container 50 proper and not the cartridge 75 it will be easy to empty the latter into the space determined by cover 78 and the position of piston 69 within the container.

It is within the purview of this invention to modify container 50 of Fig. 3 to container 10 of Fig. 1 with the exception that a controlled actuating disk 58 is used which becomes only effective when the container is brought in upside down position, as seen in Fig. 5, employing the mechanism hereinabove described in connection with Figs. 3 to 5, inclusive.

The invention may be used in connection with any dispensing devices, grease boxes and similar appliances where it is preferably required that in one position of the device no discharge of the contents of the container may be had whereas in another (inclined or upside down) position discharge of the viscous substance or mass will take place.

Consequently the mechanism as disclosed by this invention includes positively controlled driven means (screw threaded hollow piston rod and nut member) and further position-controlled actuating or operating means connectable with one of said positively controlled means (nut member) through the intermediary of coupling means carried by one of said positively controlled driven means and interconnecting said actuating means with said positively controlled driven means. Such mechanism can be readily attached to a container in which a viscous mass is placed for discharge therefrom in predetermined quantity or quantities.

While several embodiments of the invention have been shown and herein described, it will be understood that the same is capable of modifications without departure from the general scope and spirit of the invention as defined in the claims.

Having thus described the invention, what is claimed as new and desired to be secured by Letters Patent, is:

1. A dispensing device for containers to facilitate discharge of pasty or similar viscous substance therefrom; comprising an operating member, a piston adapted to move in said container and including a hollow piston rod extending therefrom to facilitate discharge of said substance therethrough to without said container, said piston rod being provided with a threaded portion, thread engaging means seated on said piston rod for engagement with said threaded portion thereof and actuatable by said operating member to thereby displace said piston rod with said piston within said container and relative to said thread engaging means, said operating member being provided with a grooved surface facing said thread engaging means, and swingable means carried by said thread engaging means for engagement with said grooved surface to couple said thread engaging means with said operating member only in predetermined position of said container.

2. The combination, in a dispensing mechanism, of an actuating member, with a hollow threaded element, a piston integral with said element, a nut member in engagement with said threaded element, means adapted to couple said nut member with said actuating member in predetermined position of the latter, and means forming part of said actuating member for the engagement of the finger of a hand to rotate in unison said actuating member and said nut member in said predetermined position.

ALFRED MATLAS.

REFERENCES CITED

The following references are of record in the file of this patent:

UNITED STATES PATENTS

| Number | Name | Date |
|---|---|---|
| 1,329,229 | Donovan | Jan. 27, 1920 |
| 2,123,741 | Newton | July 12, 1938 |
| 2,487,642 | De Waltoff | Nov. 8, 1949 |